United States Patent
Suzuki et al.

(10) Patent No.: US 6,692,365 B2
(45) Date of Patent: Feb. 17, 2004

(54) PROPELLER SHAFT AND METHOD FOR PRODUCING THE SAME

(75) Inventors: Koya Suzuki, Kariya (JP); Toshiro Kondo, Kariya (JP); Yasuki Miyashita, Kariya (JP); Yoshiharu Yasui, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/915,167

(22) Filed: Jul. 25, 2001

(65) Prior Publication Data

US 2002/0032065 A1 Mar. 14, 2002

(30) Foreign Application Priority Data

Jul. 28, 2000 (JP) .......................................... 2000-229105

(51) Int. Cl.$^7$ ................................................. F16D 3/06
(52) U.S. Cl. ....................... 464/162; 464/181; 403/359.6
(58) Field of Search ........................... 464/162, 181–183; 403/359.1, 359.6; 180/384; 188/371; 280/777

(56) References Cited

U.S. PATENT DOCUMENTS

| | | | | |
|---|---|---|---|---|
| 2,107,721 A | * | 2/1938 | Swenson | 464/162 X |
| 2,198,654 A | * | 4/1940 | Calkins et al. | 464/162 X |
| 5,226,853 A | * | 7/1993 | Courgeon | 464/162 X |
| 5,320,579 A | | 6/1994 | Hoffmann | 464/181 |
| 5,601,493 A | * | 2/1997 | Nakazono et al. | 464/181 |
| 5,911,286 A | * | 6/1999 | Boutin | 180/384 X |
| 6,099,036 A | * | 8/2000 | Fujiu et al. | 280/777 |
| 6,350,204 B1 | * | 2/2002 | Yasui et al. | 464/181 |

FOREIGN PATENT DOCUMENTS

| | | | |
|---|---|---|---|
| DE | 43 02 726 C2 | 2/1993 | |
| DE | 197 22 917 C1 | 5/1997 | |
| JP | 58-21022 | * 2/1983 | ................. 464/181 |
| JP | 62-273125 | 11/1987 | |
| JP | 6-200951 | 7/1994 | |
| JP | 7-208445 | 8/1995 | |
| JP | 07208445 A | 8/1995 | |
| JP | 7-317748 | 12/1995 | |

* cited by examiner

Primary Examiner—Greg Binda
(74) Attorney, Agent, or Firm—Morgan & Finnegan, LLP

(57) ABSTRACT

A propeller shaft 1 comprising a shaft main body 10 and a yoke 20 which is mounted to the shaft main body 10 with a serrated inserting portion 21 thereof being press fitted into an inner circumferential surface of the shaft main body 10 is constructed such that serration fit-in grooves 11 having extending portions 11b into which serration teeth 22 travel when the yoke 20 is allowed to sink into the shaft main body 10 are formed in advance in the inner circumferential surface of the shaft main body 10. A method for producing the propeller shaft 1 comprises a yoke press fitting step and a yoke withdrawing step that is to be performed after the former step.

2 Claims, 11 Drawing Sheets

PROPELLER SHAFT AND METHOD FOR PRODUCING THE SAME

BACKGROUND OF THE INVENTION

1. Field of the Invention

The present invention relates to a propeller shaft and a method for producing the same and, more particularly to a propeller shaft characterized by a joint construction between a propeller shaft main body and a yoke and a method for producing the same.

2. Description of the Related Art

A propeller shaft is a constituent component of the power transmission system of a front-engine and rear-wheel drive automotive vehicle which functions to transmit power generated by the engine to the rear wheels. The propeller shaft is, for example, disposed between the transmission and the differential of the automotive vehicle to function to transmit the rotating torque of the engine to the rear wheels.

In general, the propeller shaft comprises a tubular shaft main body, a yoke joined to one end of the shaft main body for connection to the transmission and a yoke joined to the other end of the shaft main body for connection to the differential. In recent years, to meet a demand for lightweight propeller shafts, propeller shafts have tended to be used in which the shaft main body is formed of fiber reinforced plastic (hereinafter, referred to as "FRP"). In the propeller shafts having the shaft main body of FRP, the metallic yoke is joined to the shaft main body with a part thereof being fittingly inserted into the shaft main body. In order to transmit high rotating torque generated by the engine to the rear wheels without any loss therebetween, it is crucial to prevent the occurrence of slippage between an inner circumferential surface of the shaft main body and an outer circumferential surface of the part of the yoke which is fittingly inserted into the shaft main body at the joint portion of the shaft main body and the yoke so as to assure the proper transmission of the torque therebetween. To make this happen, in many propeller shafts, serrations having axially extending teeth are formed in the outer circumferential surface of the relevant part of the yoke, so that this serrated portion is fittingly inserted into the shaft main body to be joined thereto for transmission of sufficient torque (in this specification, the term "axially" means an axial direction of the propeller shaft, and hereinafter, unless otherwise stated, the term "axially" means the axial direction of the propeller shaft).

On the other hand, there has been a tendency for a crushable construction to be adopted on the body of the automotive vehicle so as to absorb impact energy generated at the time of collision of the vehicle with another vehicle by the body to alleviate the impact that would otherwise be imparted to the passengers with a view to securing the safety of the passengers at the time of such a collision. In the event that the automotive vehicle having the crushable construction encounters in an accident involving a frontal or rear-ended collision, that is to say, that a compression load is applied to the propeller shaft in an axial direction, it is considered that the propeller shaft acts just like an impact returning rod or a prop and interferes with the absorption of the impact energy by the body. To cope with this, with a view to eliminating the interference with the absorption of impact by the body, there have been developed propeller shafts which are designed based on a concept in which the yoke sinks into the shaft main body at the time of collision. In this type of propeller shafts, it is desirable that a force required when the yoke sinks into the shaft main body or the sinking force is as small as possible.

In the propeller shaft having the aforesaid construction, however, the serrations are formed in the outer circumferential surface of the yoke to assure the proper transmission of torque, and in the event that an axial compression load is applied to the propeller shaft, the yoke has to sink into the shaft main body while the teeth of the serrations cut in the inner circumferential surface of the shaft main body, this extremely increasing the sinking force.

To cope with this, studies were made to develop technologies for reducing the sinking force of the propeller shaft with the yoke having serrations formed in the outer circumferential surface thereof, and as an example of the technologies so developed, Japanese Unexamined patent Publication 7-208445 (JP-A-7-208445) discloses a propeller shaft in which a shaft main body comprises a main layer extending over the whole of the shaft body in an axial direction thereof and a partial layer provided inside the main layer and including reinforcing fibers, wherein a yoke has a wedge having a leading end which confronts an inter-layer portion between the main layer and the partial layer, whereby when an axial compression load is applied to the yoke, the wedge separates the main layer and the partial layer from each other and sinks into the shaft main body while tearing open the shaft main body.

In this propeller shaft, the yoke having serrations formed in the outer circumferential surface thereof is press fitted into the shaft main body so as to be joined to the inner circumferential surface of the partial layer, and the transmission of rotating torque is secured between the partial layer and the yoke. On the other hand, when an axial compression load is applied to the yoke, the partial layer and the main layer of the shaft main body are separated from each other, and the yoke sinks into the shaft main body together with the partial layer to thereby reduce the sinking force. Namely, according to the construction of this propeller shaft, the aforesaid problem is solved by a construction in which the propeller shaft is divided into a portion for securing high rotating torque transmission properties and a portion for securing a small sinking force.

However, while the propeller shaft disclosed in JP-7-208445 is said to provide a smaller sinking force when compared to a conventional propeller shaft in which a yoke having serrations formed in an outer circumferential surface thereof is simply fittingly inserted into a shaft main body (hereinafter, referred to as a "conventional propeller shaft"), the sinking force provided thereby still does not meet the satisfactory level as a certain force is still required to separate the integrally formed main and partial layers from each other. In addition, in this propeller shaft, even when there is applied no axial compression load to the yoke or during a normal operation, depending upon the condition where the main and partial layers are integrally formed, it may be considered that the two layers separate from each other. Furthermore, since the main and partial layers have to be provided on the shaft main body and the wedge has to be provided on the yoke, the production process becomes complicated, this increasing the production cost. Thus, the propeller shaft disclosed in JP-7-208445 is still suffering from the aforesaid problems at this point in time.

SUMMARY OF THE INVENTION

The present invention was made to solve the aforesaid problem of compatibility of sufficient torque transmission with a smaller sinking force, which propeller shafts are facing, which each have a mechanism in which a yoke sinks into a shaft main body thereof, and an object thereof is to provide a propeller shaft that can provide a smaller sinking force while securing good rotating torque transmission properties, and which is simple in construction and low in production cost, by forming in advance grooves in an inner circumferential surface of a shaft main body for serration teeth to travel therealong when a yoke sinks into the shaft main body. The other object of the invention is to provide a method for producing the same propeller shaft through a simple work.

With a view to attaining the objects, according to a first aspect of the invention, there is provided a propeller shaft comprising a tubular shaft main body made of FRP and a metallic yoke having an inserting portion which has serrations having axially extending teeth formed in an outer circumferential surface thereof and mounted in at least one end portion of the shaft main body with the inserting portion being slide fitted into an inner circumferential surface of the one end portion of the shaft main body, wherein the shaft main body comprises serration fit-in grooves formed on the inner circumferential surface thereof and having serration fit-in portions into which the teeth of the serrations are allowed to fit and extending portions formed continuously with the serration fit-in portions so as to extend more inwardly from axially central side ends of the teeth of the serrations toward an axial center of the shaft main body.

In other words, the propeller shaft according to the invention has formed in the inner circumferential surface thereof the serration fit-in grooves having the serration fit-in portions and the extending portions and thereby provides a mechanism in which during a normal operation, the teeth of the serrations formed in the outer circumferential surface of the inserting portion of the yoke come into mesh engagement with the serration fit-in portions of the serration fit-in grooves formed on the inner circumferential surface of the shaft main body to thereby transmit rotating torque properly, whereas, when an axial compression load of certain magnitude is applied to the yoke, the teeth of the serrations are allowed to travel along the extending portions formed continuously with the serration fit-in portions, whereby the yoke is allowed to sink into the shaft main body.

However, in conventional propeller shafts, no such extending portions of the serration fit-in grooves are formed on the inner circumferential surface of the shaft main body, and therefore, in order to allow the yoke to sink into the shaft main body, the axially central side ends (hereinafter, referred to as "distal ends") of the serration teeth on the outer circumferential surface of the yoke need to advance by partially cutting-out the inner circumferential surface of the shaft main body as if a groove is carved out with a chisel. In addition, a friction force generated at contact portions between the serration teeth and the inner circumferential surface of the shaft main body need to be overcome. Due to this, in the event that an axial compression force is applied to the yoke in a traffic accident or the like, unless the load so applied is greater than the sum of the cutting force and the friction force, the yoke is not allowed to sink into the shaft main body.

On the contrary, in the propeller shaft according to the first aspect of the invention, the extending portions of the serration fit-in grooves are formed in advance in the inner circumferential surface of the shaft main body before the yoke sinks thereinto. Due to this, when the yoke sinks into the shaft main body, almost no aforesaid cutting force which is required when the serration teeth advance cutting out partially the inner circumferential surface of the shaft main body is required, and in the event that an axial compression force of certain magnitude is applied to the yoke in a traffic accident or the like, the yoke is allowed to sink into the shaft main body with a load of small magnitude. To make it simple, when compared with the conventionally used propeller shafts, the sinking force needed to allow the yoke to sink into the shaft main body becomes smaller by such an extent that no inner circumferential surface needs to be cut out.

Thus, according to the first aspect of the invention, there is provided the propeller shaft in which, in the event that an axial compression load is applied to the yoke, the yoke is allowed to sink into the shaft main body with a force smaller in magnitude than that required with the conventionally used propeller shafts, thereby making it possible to improve the safety of an automotive vehicle incorporating the same propeller shaft of the invention.

Additionally, according to a second aspect of the invention, there is provided a propeller shaft, wherein the extending portions of the serration fit-in grooves are formed deeper than the serration fit-in portions. That is, in the propeller shaft according to this aspect of the invention, the groove depth of the extending portions where the serration teeth travel when the yoke sinks into the shaft main body is made deeper than that of the serration fit-in portions. Here, that the extending portions are "formed deeper" than the serration fit-in portions means that the shortest distance from the axial center line of the shaft main body to the bottom of the groove of the extending portion, that is to say, the radius, is greater than the radius from the same center line to the bottom of the groove of the serration fit-in portion.

In the propeller shaft according to the second aspect of the invention, since the grooves of the extending portions are formed deeper than those of the serration fit-in portions and the tightening force of the shaft main body is smaller, there is generated less friction force, and the serration teeth can travel smoothly when the yoke sinks into the shaft main body. Namely, the propeller shaft according to the second aspect of the invention allows the yoke to sink into the shaft main body with a smaller sinking force.

Furthermore, according to a third aspect of the invention, there is provided a propeller shaft, wherein the thickness of the shaft main body is made thicker within a predetermined portion ranging from the one end of the shaft main body where the yoke is mounted toward the axial center thereof, and wherein the axially central side ends of the extending portions of the serration fit-in grooves are located at positions coinciding with an axially central side end of the predetermined portion or closer to the one end of the shaft main body than the axially central side end of the predetermined portion.

Namely, the propeller shaft according to the third aspect of the invention has the portion which is made thicker at the one end portion of the shaft main body, and the serration fit-in grooves are formed on the inner circumferential surface of the thicker portion. In general, an end portion of a shaft main body made of FRP is formed thicker for reinforcement against the press fitting of a yoke thereinto by means of laminating an extra layer or layers of reinforced fibers. On the other hand, forming grooves on the inner circumferential surface of the FRP shaft main body reduces the torsional moment when the shaft main body fails from torsional buckling, that is, the torsional strength, and therefore tends to easily cause the torsional failure of the shaft main body. In the propeller shaft according to the third aspect of the invention, since the grooves are formed on the inner circumferential surface of the thicker portion or reinforced portion of the shaft main body and no groove is formed on the inner circumferential surfaces of any other portions than the reinforced portion, the reduction in torsional strength due to grooves can be prevented as much as possible.

There exists no particular limitation to methods for producing the aforesaid propeller shaft according to the invention, and therefore, the propeller shaft of the invention may be produced by using various conventional methods that have been used for producing propeller shafts. However, according to a propeller shaft producing method of the invention, which will be described below, the propeller shaft according to the invention may be produced easily with respect to joining a yoke to a shaft main body. According to a fourth aspect of the invention, there is provided a method for producing the aforesaid propeller shaft according to the invention comprising a yoke press fitting step of press fitting the yoke into the one end of shaft main body to a position where the teeth of the serrations fit in the extending portions while continuously forming the serration fit-in portions and the extending portions of the serration fit-in grooves on the inner circumferential surface of the shaft main body with the teeth of the serrations, and a yoke withdrawing step of withdrawing the yoke to a position where the teeth of the serrations fit in the serration fit-in portions.

That is, in the method for producing the propeller shaft according to the fourth aspect of the invention, in the yoke press fitting step, the serration fit-in grooves having the serration fit-in portions and the extending portions are formed on the inner circumferential surfaces of the shaft main body with the cutting force and the friction force of the serration teeth on the outer circumferential surface of the yoke, and in the yoke withdrawing step, the yoke is withdrawn to the position where the serration teeth fit in the serration fit-in portions of the serration fit-in grooves or a predetermined position where the yoke is put in operation in the normal operating condition. Speaking more simply, the grooves that mesh engage the serration teeth are formed by inserting the yoke to a deeper position in the shaft main body once, and thereafter, the yoke is withdrawn to the predetermined position where the yoke is put in operation in the normal operating condition. As a result of this, the extending portions are formed as spaces on a distal end side of the serrations.

In this production method, the serrations fit-in grooves are formed mainly in the yoke press fitting step. Described below will be the details of the formation of the serration fit-in grooves in the yoke press fitting step. First, the leading ends of the serration teeth formed in the outer circumferential surface of the inserting portion of the yoke cut out partially the relevant portions of the inner circumferential surface of the shaft main body as if a groove is carved with a chisel to thereby form notches. As the serration teeth travel along deeper inside the shaft main body, the notches so formed extend toward the axial center of the shaft main body to thereby form continuous grooves. At the same time, the grooves so formed by the leading ends of the serration teeth are made to become deeper when the grooves are brought into friction contact with the top and sides of the respective serrations each having a certain length in the axial direction as the yoke is press fitted into the shaft main body.

In the production method according to the fourth aspect of the invention, terminating points where the serration teeth which travel as the yoke is press fitted into the shaft main body stop moving in the yoke press fitting step or distal end positions of the serration teeth resulting at the end of the yoke press fitting step constitute the axial central side ends of the extending portions of the serration fit-in grooves. On the other hand, in the yoke withdrawing step, the yoke is caused to travel back along the serration fit-in grooves to the position where the serration teeth fit in the serration fit-in portions of the serration fit-in grooves. Consequently, terminating points where the distal ends of the serration teeth which travel back as the yoke is withdrawn stop moving constitute the axial central side ends of the serration fit-in portions of the serration fit-in grooves or axial end portion side ends of the extending portions, and terminating points where axial end portion side ends (hereinafter, referred to as "proximal ends") of the serration teeth stop moving constitute axial end portion side ends of the serration fit-in portion of the serration fit-in grooves.

According to the propeller shaft production method of this aspect of the invention, the shaft main body and the yoke of the propeller shaft according to the invention can be joined to each other by performing extremely simple operations such as press fitting and withdrawing the yoke into and from the shaft main body. Even when compared with the conventional propeller shafts in which the shaft main body and the yoke thereof are joined to each other by performing a press fitting operation only, the production method of the invention simply adds operations of extra further press fitting the yoke and withdrawing the same yoke, and the method not only causes no remarkable loss in production efficiency but also requires no special devices. Consequently, with the production method according to the fourth aspect of the invention, the propeller shaft of the invention which only needs a sinking force of small magnitude while securing good rotating torque transmission properties can be produced in an extremely easy manner.

Additionally, in the propeller shaft according to the invention, in order to assure the proper torque transmission between the yoke and the shaft main body, the yoke is press fitted into the shaft main body the outside diameter (a diameter of a circle imaginarily formed by connecting top land portions of the respective serration teeth) of whose inserting portion is greater than the inside diameter of the shaft main body. Consequently, in the yoke press fitting step of the production method according to the invention, when the yoke is press fitted into one end portion of the shaft main body, a portion of the inner circumferential surface of the shaft main body through which the inserting portion of the yoke is about to pass is expanded in diameter within an elastic range of the shaft main body. Then, at the proximal end of the shaft main body through which the inserting portion of the yoke has passed, the shaft main body contracts in diameter by virtue of the elastic force (restoring force) of the shaft main body, whereby the diameter thereof is restored to the original diameter. Also in the yoke withdrawing step, the inner circumferential surface of the shaft main body similarly expands and contracts in diameter as the inserting portion of the yoke passes therethrough.

In view of these phenomena, the formation of the serration fit-in grooves is also performed by the serration teeth in the yoke withdrawing step as well. That is, there is generated another opportunity for the serration fit-in grooves which are once formed by the inserting portion of the yoke which passes therethrough in the yoke press fitting step to be formed deeper with the serration teeth as a result of the contraction of the diameter of the shaft main body. Then, also in the yoke withdrawing step, as with the yoke press fitting step, the proximal ends of the serration teeth in the inserting portion of the yoke act if they were a chisel to thereby carve further deeply the serration fit-in grooves formed in the yoke press fitting step.

Namely, the serration fit-in grooves formed through the additional yoke withdrawing step become deeper in groove depth when compared with the serration fit-in grooves formed only through the yoke press fitting step, and therefore, the fitting of the serration teeth into the serration fit-in portions of the serration fit-in grooves becomes stronger, thereby making it possible to assure further the proper transmission of rotating torque between the relevant components. Consequently, with the production method according to the fourth aspect of the invention, it is possible to obtain an advantage that the rotating torque transmission properties of the propeller shaft is improved.

With the aforesaid function of the production method being used in which the serration fit-in grooves are formed through both the yoke press fitting step and the yoke withdrawing step, according to a fifth aspect of the invention, there is provided a method for producing the propeller shaft as set forth in the fourth aspect of the invention, wherein a yoke reciprocating step is further included which is adapted to be performed at least once between the yoke press fitting step and the yoke withdrawing step and in which the yoke is withdrawn and press fitted such that the serration teeth at least reciprocate between a position where the serration teeth fit in the extending portions of the serration fit-in grooves and a position where the serration teeth fit in the serration fit-in portions of the same grooves.

That is, in this production method according to the fifth aspect of the invention, the inserting portion of the yoke is press fitted and withdrawn a plurality of times between a position where the yoke exists at the end of the yoke press fitting step (the "position where the serration teeth fit in the extending portion" means this position) and a position where the yoke exists when the serration teeth are located in the serration fit-in portions of the serration fit-in grooves.

According to the production method of the fifth aspect of the invention, the serration fit-in portions and the extending portions of the serration fit-in grooves can be made deeper by repeating the yoke press fitting step and the yoke withdrawing step a plurality of times. With the deeper serration fit-in portions, as has been described above, the proper transmission of rotating torque between the yoke and the shaft main body is further assured. In addition, with the deeper extending portions, a friction force becomes smaller in magnitude which is generated between the serration teeth of the yoke and the extending portions when the yoke is caused to sink into the shaft main body by virtue of a certain axial compression load. Consequently, with the production method of the fifth aspect of the invention, the propeller shaft can be produced in an easy manner which can improve the rotating torque transmission properties and needs only a sinking force of small magnitude.

Additionally, according to a sixth aspect of the invention, there is provided a method for the propeller shaft, wherein the diameter of a portion where the extending portions of the serration fit-in grooves are formed in the inner circumferential surface of the shaft main body is contracted by applying a stress of certain magnitude to an outer circumferential surface of the shaft main body, and after the extending portions are formed, the diameter of the portion of the inner circumferential surface of the shaft main body is expanded by removing the stress therefrom, whereby the extending portions of the serration fit-in grooves are formed deeper than the serration fit-in portions of the same grooves.

In other words, in the propeller shaft production method according to the sixth aspect of the invention, the stress is applied from the outside to the portion of the shaft main body where the extending portions are formed so that the inside diameter of the portion is contracted, and in this state the yoke press fitting and withdrawing operations or either of the operations is performed so as to form the extending portions of the serration fit-in grooves. Then, after the extending portions are formed, the applied stress is removed, so that the diameter of the portion is expanded by virtue of the spring-back of the shaft main body. As a result, the extending portions of the serration fit-in grooves can be formed deeper than the serration fit-in portions of the same grooves. According to the propeller shaft production method of the sixth aspect of the invention, the propeller shaft can be produced in an extremely easy manner which can make a sinking force required by the yoke extremely low when sinking into the shaft main body by forming the extending portions of the serration fit-in grooves deeper than the serration fit-in portions of the same grooves.

Note that, as has been described heretofore, the shaft main body is expanded in diameter as the inserting portion of the yoke passes therethrough. Even if the portion where the extending portions are formed is not actually expanded in diameter, if the expansion of the shaft main body resulting from the passage of the inserting portion of the yoke is suppressed by a certain means, an effect can be obtained which corresponds to the effect provided by actually contracting the relevant portion. That is, even if no stress is actually applied to the outer circumferential surface of the shaft main body, if the outer circumferential surface of the relevant portion is restricted with a retainer band or the like, there is generated a reaction force when the inserting portion of the yoke passes through the restricted portion, this creating a condition where the stress is actually applied to the outer circumferential surface, whereby the diametrical expansion of the inner circumferential surface of the relevant portion is restricted. Consequently, the "contraction in diameter" of the inner circumferential surface of the shaft main body at the portion where the expanding portions according to the aspect of the invention are formed means a relative contraction in diameter, that is, the restriction of the diametrical expansion of the relevant portion of the shaft main body that would be otherwise caused as the inserting portion of the yoke passes through the relevant portion. In addition, similarly, the "expansion" means not only the actual expansion but also the restoration to the original inside diameter.

The present invention will be more fully understood with reference to the accompanying drawings and the preferred embodiments of the invention.

DESCRIPTION OF THE PREFERRED EMBODIMENTS

Figure 1:
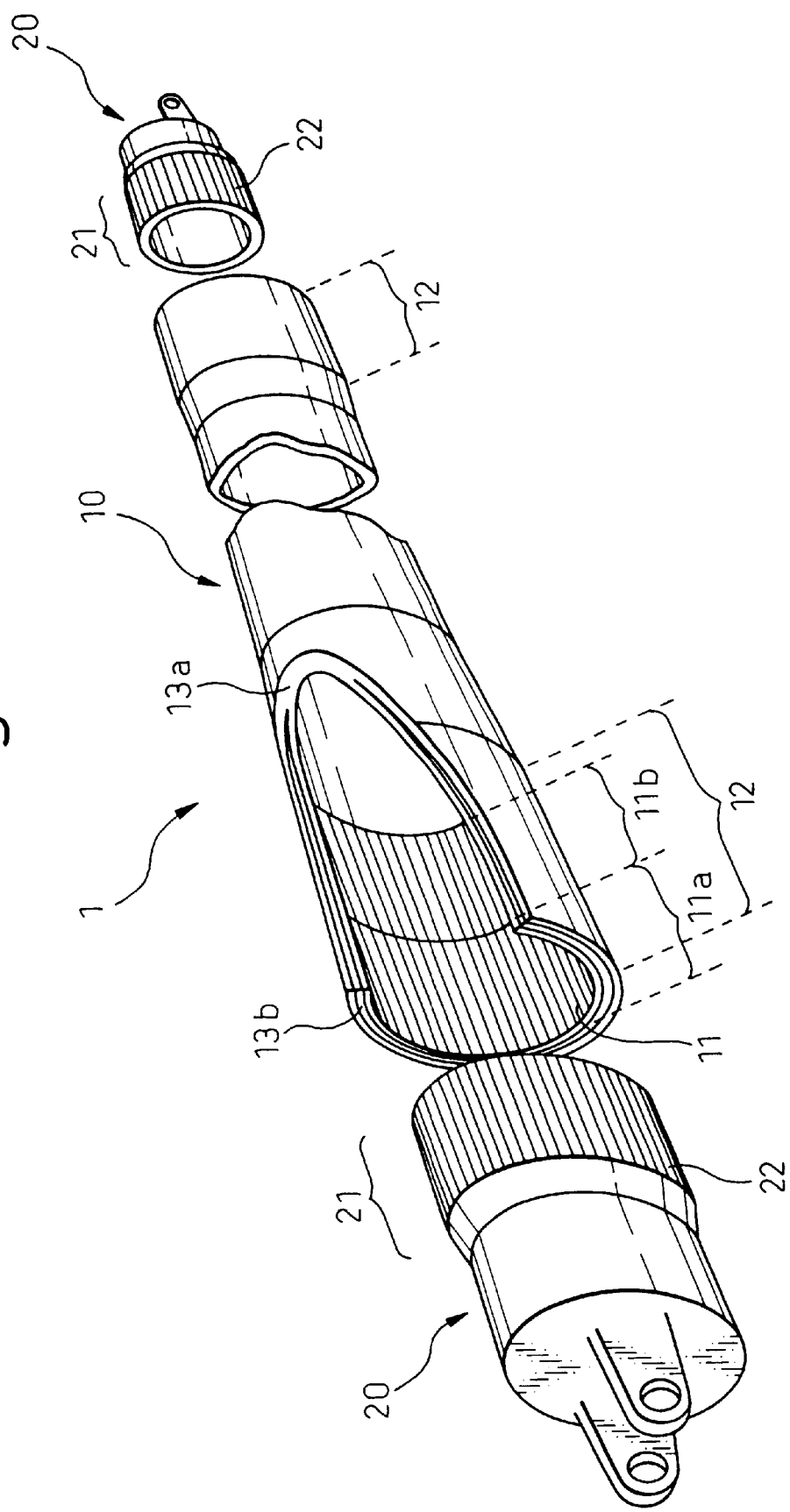
FIG. 1 is a perspective view of a propeller shaft according to an embodiment representative of the invention.
Figure 2:
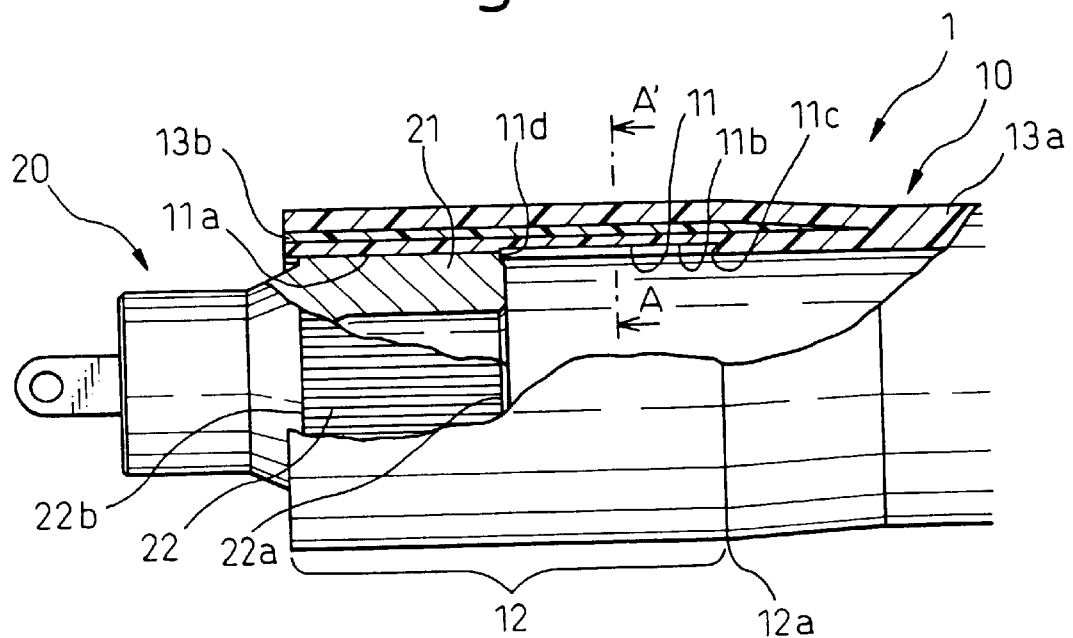
FIG. 2 is an axially partially sectional view of the propeller shaft according to the embodiment representative of the invention.
Figure 3:
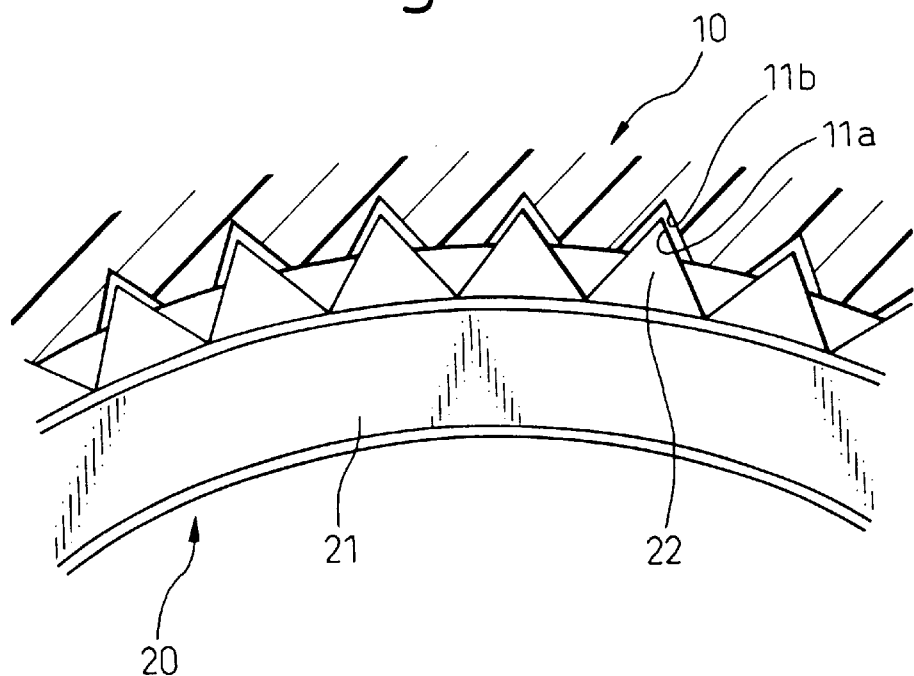
FIG. 3 is a partially enlarged cross-sectional view of the propeller shaft according to the embodiment representative of the invention taken along a direction normal to the axis thereof (a cross section taken along the line A—A in FIG. 2)

Preferred embodiments of the invention will be described below by describing preferred embodiments of a propeller shaft according to the invention and a method for producing the propeller shaft according to the invention, separately.
Preferred Embodiments of a Propeller Shaft of the Invention First, a propeller shaft according to an embodiment representative of the invention will be described. FIG. 1 shows a perspective view of a propeller shaft according to an embodiment representative of the invention, FIG. 2 is an axially partially sectional view of the propeller shaft, and FIG. 3 shows a partially enlarged cross-sectional view of the propeller shaft taken along a direction normal to the axis thereof (a cross-sectional view taken along the line A—A in FIG. 2). Note that FIG. 1 shows a state in which a yoke is removed from a shaft main body.

A propeller shaft according to the embodiment comprises a tubular shaft main body 10 made of FRP and two metallic yokes 20 which are mounted to end portions of the shaft main body 10. Serrations having axially extending teeth are formed in a part of an outer circumferential surface of the yoke 20, and this serrated portion constitutes an inserting portion 21, whereby the yoke 20 is mounted to the shaft main body 10 by allowing the inserting portion 21 to be slide fitted in an inner circumferential surface of an end portion of the shaft main body 10.

A plurality of serration fit-in grooves 11 are formed in the inner circumferential surfaces of the end portions of the shaft main body 10 for mesh engagement with the teeth of the serrations. The serration fit-in grooves 11 comprise serration fit-in portions 11a into which the teeth 22 of the serration fit and extending portions 11b formed continuously with the serration fit-in portions and extending more axially centrally of axially central side ends of the teeth 22 of the serrations. Note that, in this embodiment, the extending portions 11b are formed more deeply than the serration fit-in portions 11a.

In the propeller shaft 1 according to this embodiment, with a view to preventing the reduction in strength in association with the mounting of the yokes 20, the shaft main body 10 has reinforced portions 12 which are made thicker over predetermined portions extending from the respective ends toward the axial center of the shaft main body at both the end portions thereof where the yokes 20 are mounted. Although the details of a production method thereof will be described later, the shaft main body 10 has a laminating construction in which fibers are wound around, and the reinforced portions 12 are constructed such that reinforced fiber layers 13b of a predetermined thickness are inserted into a main fiber layer 13a in which fibers are laminated to a certain thickness over the overall length of the shaft main body 10 at the ends thereof. Axially central side ends 11c of the extending portions 11b of the serration fit-in grooves 11 are located at the same axial positions as axially central side ends 12a of the reinforced portion 12. Namely, the reinforced portions 12 are formed at both the end portions of the shaft main body 10, and the serration fit-in grooves 11 are formed only in the inner circumferential surfaces of the reinforced portions 12.

In the propeller shaft according to the embodiment of the invention, in a normal operating condition, torque transmission between the shaft main body 10 and the yokes 20 is secured through the mesh engagement of the serration fit-in portions 10 of the serration fit-in grooves 11 with the teeth 22 of the serrations. On the other hand, when an axial compression load (a force pressing the yoke in an axially central direction) is applied to the yoke 20, the state of the propeller shaft of the embodiment changes to a state shown in FIG. 4. That is, the serration teeth 22 travel to the extending portions 11b formed continuously with the serration fit-in portions 11a along the serration fit-in grooves 11, whereby the yoke 20 is allowed to sink into the shaft main body 10.

On the contrary, with a propeller shaft of conventional type, since there exist no portions corresponding to the extending portions 11b in the serration fit-in groove portion thereof, a sinking force of large magnitude is required for allowing the yoke to sink into the shaft main body. In contrast to this, with the propeller shaft 1 according to the embodiment of the invention, since the serration fit-in grooves 11 have the extending portions 11b, when an axial compression load is applied to the yoke, no force is required for allowing the yoke 20 to sink into the shaft main body 10 while cutting out partially the inner circumferential surface thereof but only an extremely small magnitude of force is required to allow the yoke 20 to sink into the shaft main body 10.

In the propeller shaft 1 according to the embodiment, where the yokes 20 having the same construction are joined to both the end portions of the shaft main body 10 in the same manner, instead of this mode, the invention may be embodied into a propeller shaft of another mode in which the yoke 20 of the above construction is joined to only one of the end portions of the shaft main body using the same joining method. In this case, various known modes may be adopted for the other end of the propeller shaft including, for example, a mode in which a flange or the like is joined thereto.

In addition, in the propeller shaft 1 according to the embodiment, while the extending portions 11b of the serration fit-in grooves are formed more deeply than the serration fit-in portions 11a, so that almost no cutting force needs to be provided by the distal ends of the teeth of the serration, instead of this mode, the invention may be embodied into a propeller shaft of another mode in which the extending portions 11b and the serration fit-in portions 11a are formed so as to have the same groove depth. Furthermore, the invention may be embodied into a propeller shaft of a further mode in which the extending portions 11b are shallower than the serration fit-in portions. Since the sinking force required by any of the propeller shafts above becomes smaller in magnitude than the sinking force required by the conventional propeller shafts as long as the extending portions 11b are formed, even with the propeller shaft having the extending portions 11b shallower than the serration fit-in portions 11a, the yoke can sink into the shaft main body sufficiently easily when compared with the conventional propeller shafts.

Note that in the propeller shaft 1 according to the embodiment while a boundary 11d between the serration fit-in portions 11a and the extending portions 11b of the serration fit-in grooves 11 is formed as a gap in the axial cross section where the groove depth of the two different portions changes drastically, the propeller shaft according to the invention does not always need that clear boundary but may be constructed such that the groove depth gradually increases from the serration fit-in portions to the extending portions.

Moreover, in the propeller shaft 1 according to the embodiment, while the serration fit-in grooves 11 are formed in the inner circumferential surface of the reinforced portion 12 so as to effectively prevent the reduction in strength of the shaft main body in association with the formation of the serration fit-in grooves to thereby enable the proper transmission of torque between the yoke and the shaft main body in an assured fashion, in a case where the shaft main body is provided with a sufficient strength or the like, instead of this mode, the invention may be embodied into a propeller shaft in which no reinforced portion is formed on the shaft main body thereof. Alternatively, in the event that the invention is embodied into a propeller shaft which is sufficiently strong but provided with the reinforced portion or portions, the serration fit-in grooves are formed in such a manner as to extend beyond the reinforced portion or portions. In other words, to describe this mode more specifically with reference to FIG. 2, the axially central side ends 11c of the extending portions 11b of the serration fit-in grooves 11 protrude further axially centrally from the axially central side ends 12a of the reinforced portion 12.

Figure 4:
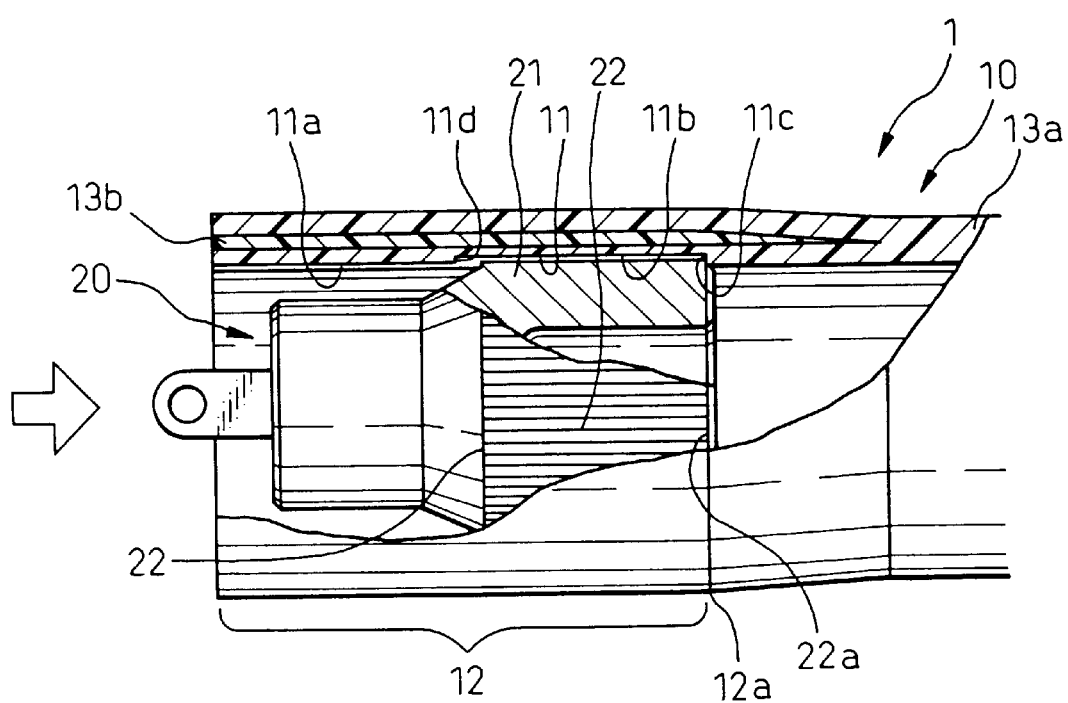
FIG. 4 is an axially partially sectional view of the propeller shaft according to the embodiment representative of the invention, showing a state in which a yoke sinks in a shaft main body.

Furthermore, in the propeller shaft according to the embodiment, as seen from FIG. 4, while the axial length of the inserting portion of the yoke 20 where the serrations are formed is made shorter than the axial length of the extending portions 11c of the serration fit-in grooves 11, with the propeller shaft according to the invention, there is no specific limitation to the relationship between the lengths of the inserting portion of the yoke and the extending portions 11 of the serration fit-in grooves 11. A proper length relationship may be provided in view of an effective torque transmission performance and a designed sinking margin in the event that a compression load of a certain magnitude is applied to the yoke during a traffic accident or the like.

In the propeller shaft of the invention, on top of the aforesaid length-related relationship, there is no specific limitation to the cross-sectional configuration of the serration fit-in grooves, the cross-sectional configuration of the teeth of the serrations, the length and number of teeth of the serrations, the depth of the serration fit-in grooves or the like but the propeller shaft may be modified using various modes depending upon objects and applications. Moreover, the embodiment described heretofore is only one example of the propeller shaft according to the invention and, therefore, the invention may be carried out in various modes including the embodiment described above which could be improved or modified by those skilled in the art.

Embodiment of a Propeller Shaft Producing Method of the Invention

There is no specific limitation to a production method for producing the propeller shaft according to the invention, however, the propeller shaft may be produced more easily using a production method according to the invention with respect to joining the yoke to the shaft main body than in a case of using other methods.

Figure 5:
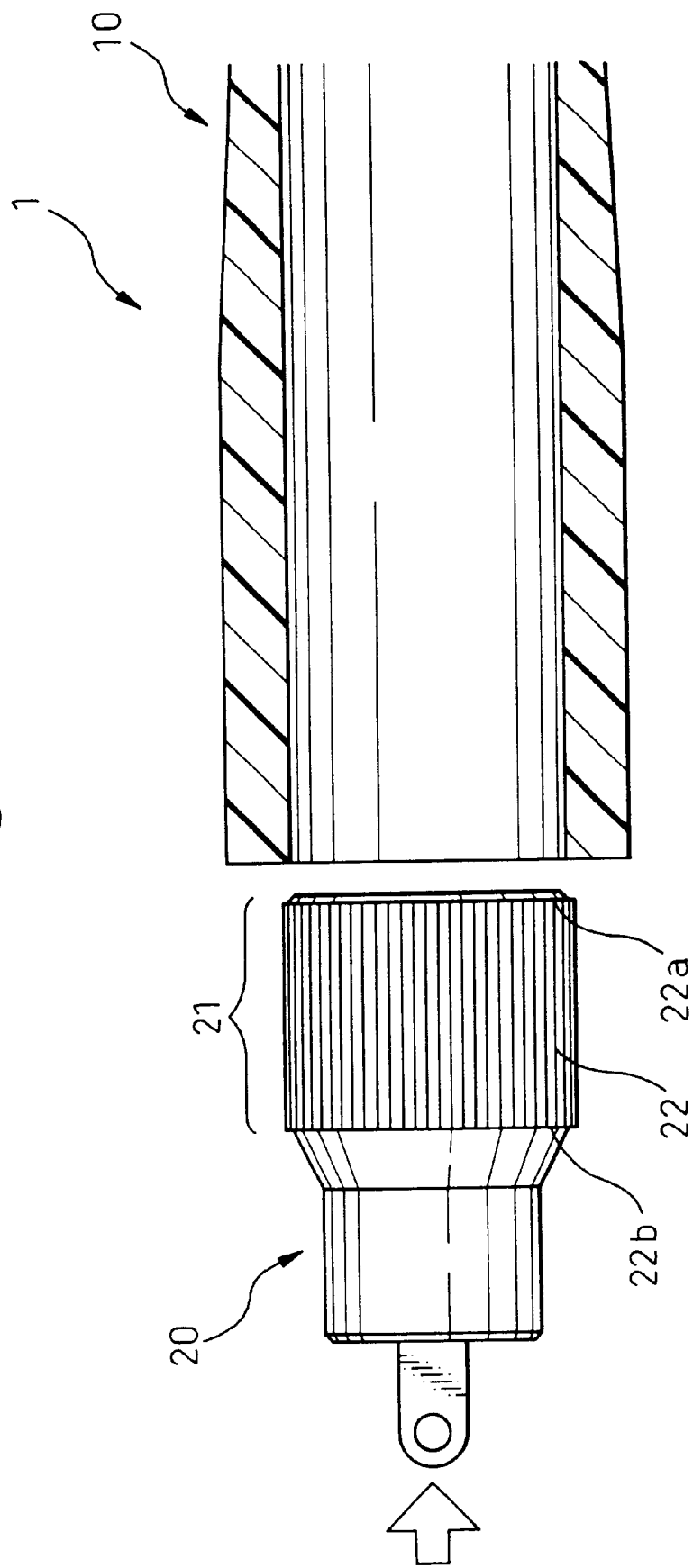
FIG. 5 is a diagram showing a state immediately before the yoke is press fitted into the shaft main body in a yoke press fitting step of a propeller shaft production method according to the invention.
Figure 6:
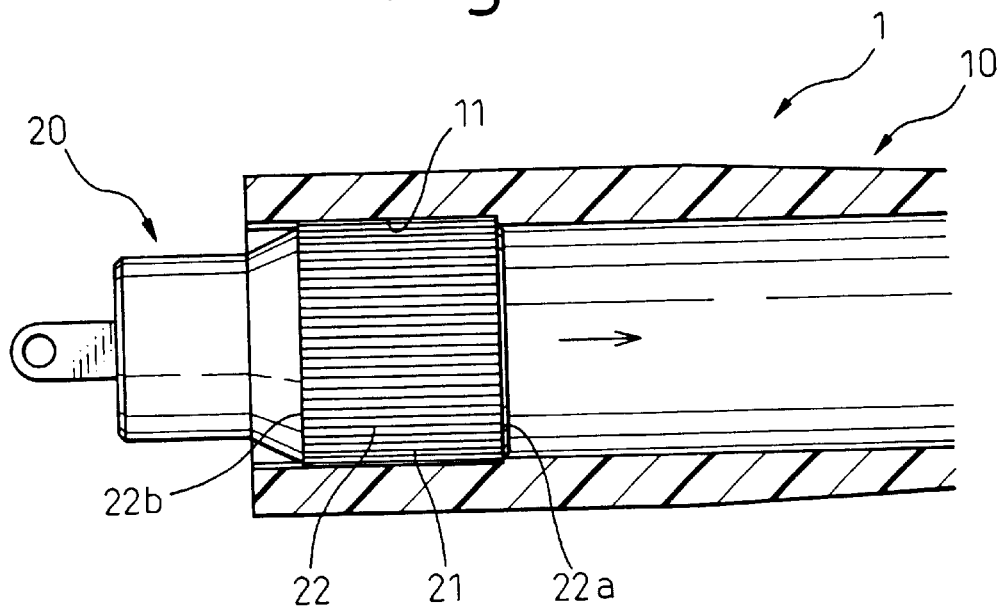
FIG. 6 is a diagram showing a state in which serration fit-in grooves are formed with serration teeth in the yoke press fitting step of the production method according to the invention.
Figure 7:
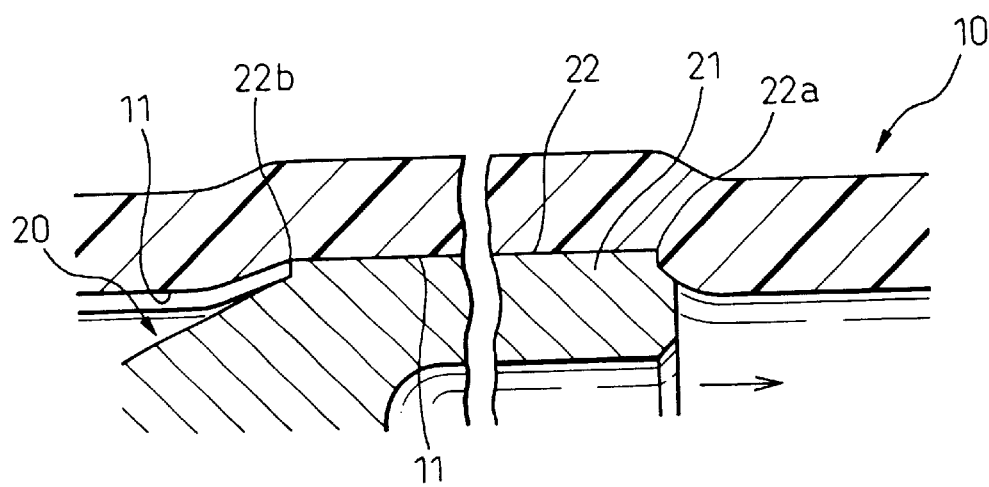
FIG. 7 is a diagram showing a state in which the serration fit-in grooves are formed in an inner circumferential surface of the shaft main body in the yoke press fitting step of the production method according to the invention.
Figure 8:
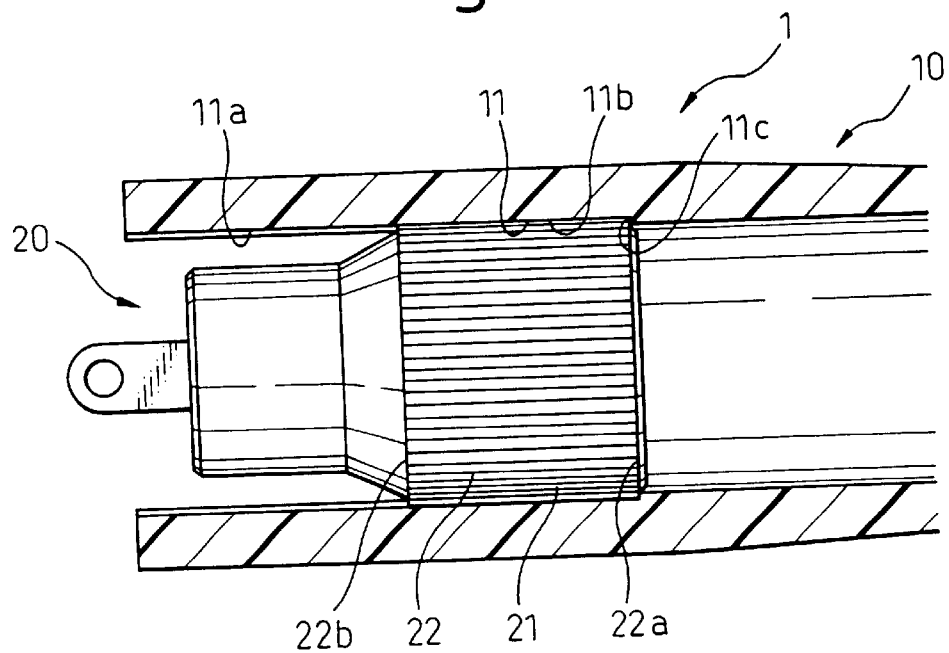
FIG. 8 is a diagram showing a state in which the yoke press fitting step of the production method according to the invention terminates.
Figure 9:
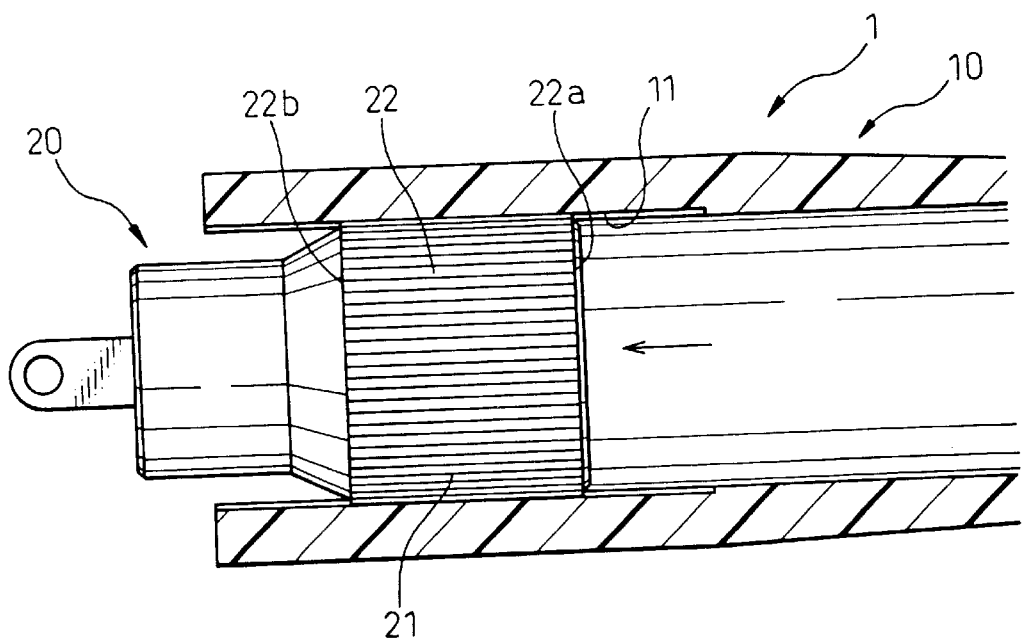
FIG. 9 is a diagram showing a state in which the yoke is withdrawn with the serration teeth traveling back along the serration fit-in grooves in a yoke withdrawing step of the production method according to the invention.
Figure 10:
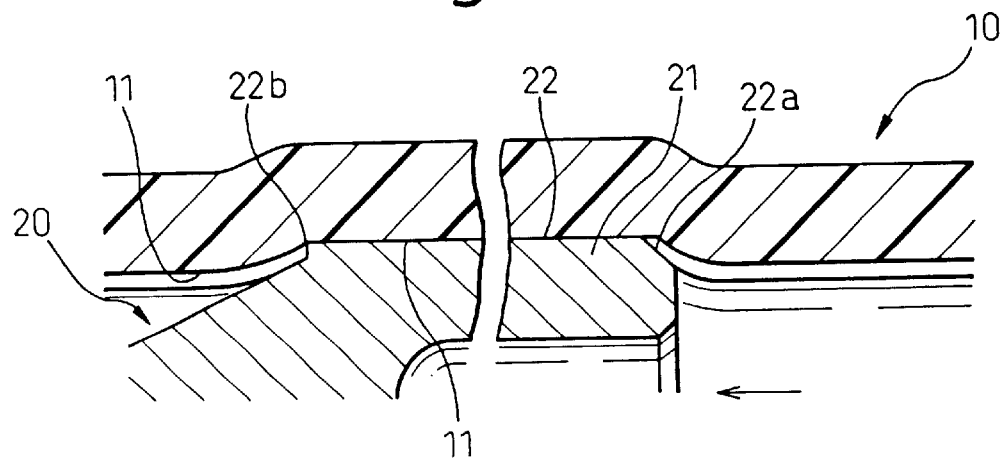
FIG. 10 is an enlarged view showing a state in which the serration fit-in grooves are formed more deeply in the yoke withdrawing step of the production method according to the invention.
Figure 11:
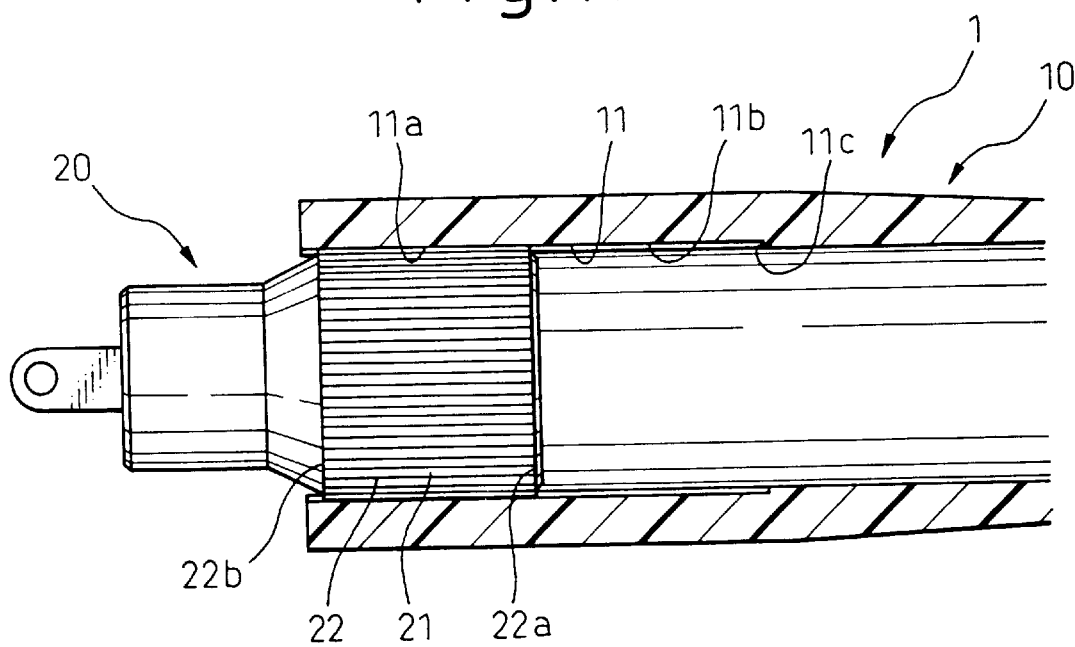
FIG. 11 is a diagram showing a state in which the yoke withdrawing step of the propeller shaft production method terminates.

Referring to FIGS. 5 to 11, a production method according to an embodiment representative of the invention will be described below. The production method according to the embodiment comprises a yoke press fitting step of press fitting the yoke into one end portion of the shaft main body while continuously forming the serration fit-in portions and the extending portions of the serration fit-in grooves 11 in the inner circumferential surface of the shaft main body with the teeth of the serrations formed on the yoke to a position where the teeth of the serrations fit in the extending portions so formed and a yoke withdrawing step of withdrawing the yoke to a position where the teeth of the serrations fit in the serration fit-in portions. FIG. 5 shows a state immediately before the yoke is press fitted into the shaft main body in the yoke press fitting step, FIG. 6 shows a state in which the serration fit-in grooves are being formed with the serration teeth in the yoke press fitting step, FIG. 7 shows a state in which the serration fit-in grooves are being formed in the inner circumferential surface of the shaft main body in the yoke press fitting step, FIG. 8 shows a state in which the yoke press fitting step terminates, FIG. 9 shows a state in which the yoke is being withdrawn with the serration teeth traveling back along the serration fit-in grooves in the yoke withdrawing step, FIG. 10 shows a state in which the serration fit-in grooves are formed more deeply in the yoke withdrawing step, and FIG. 11 shows a state in which the yoke withdrawing step terminates.

In the yoke press fitting step, the shaft main body is gripped to be held and fixed by a fixture, and first, as shown in FIG. 5, the metallic yoke 20 starts to be press fitted into the shaft main body 10 with the axes thereof being aligned with each other. Although not shown, the yoke 20 is press fitted while being gripped to be held and fixed with a press fitting machine operable hydraulically or by other means. As the press fitting of the yoke 20 progresses, as shown in FIG. 6, the serration fit-in grooves 11 are formed in the inner circumferential surface of the shaft main body 10 with the serration teeth 22 formed on the outer circumferential surface of the inserting portion 21 of the yoke 20. To describe this more specifically, the inner circumferential surface of the shaft main body is cut out partially with the distal ends 22*a* of the serration teeth 22 formed on the outer circumferential surface of the inserting portion of the yoke 20 as if a groove is cut out with a chisel to thereby form notches. Then, when these notches proceed to extend as the serration teeth 22 travel, the serration fit-in grooves are formed. Thus, the serration fit-in grooves 11 are formed on the inner circumferential surface of the shaft main body 10 in the yoke press fitting step.

Since the outside diameter of the inserting portion 21 of the yoke 20 is slightly greater than the inside diameter of the shaft main body 10, in reality, as shown in an exaggerated fashion in FIG. 7, the serration fit-in grooves are formed while the inner circumferential surface in which the serration fit-in grooves 11 are formed is being expanded diametrically at a portion where the inserting portion 21 of the yoke 20 passes when the inserting portion 21 of the yoke 20 passes therethrough. After the inserting portion 21 has passed through the relevant portion, in other words, at the rear of the inserting portion, the inner circumferential surface is contracted diametrically again by virtue of the elastic force of the shaft main body.

At the time of termination of the press fitting step, as shown in FIG. 8, the yoke 20 reaches a terminating point. At this point in time, the serration teeth 22 once complete the formation of both the serration fit-in portions 11*a* and the extending portions 11*b* of the serration fit-in grooves 11, and the positions where the distal ends 22*a* of the serration teeth 22 come to a stop constitute the axially central side ends 11*c* of the extending portions 11*b*. That is, the terminating position of the traveling yoke coincides with the position where the aforesaid serration teeth fit in the extending portions.

Next, the yoke withdrawing step will be described. In this yoke withdrawing step, as shown in FIG. 9, the serration teeth 22 travel back along the serration fit-in grooves 11 formed in the aforesaid yoke press fitting step, whereby the yoke 22 is withdrawn. Similarly to the yoke press fitting step, also in the yoke withdrawing step, as shown in the exaggerated fashion in FIG. 10, the yoke 20 is withdrawn while the inner circumferential surface of the shaft main body 10 is being diametrically expanded. Since, as this occurs, the proximal ends 22*b* of the serration teeth 22 advance cutting the groove bottoms of the serration fit-in grooves which have already been formed as if done with the chisel, the serration fit-in grooves become deeper. In other words, the formation of the serration fit-in grooves is progressed even in the yoke withdrawing step.

At the time of termination of the yoke withdrawing step, as shown in FIG. 11, the yoke 20 reaches a terminating point. At this point in time, the serration teeth 22 once again complete the further formation of the serration fit-in grooves 11 and stop at a predetermined position. This predetermined position constitutes a position where the serration teeth 22 fit in the serration fit-in portions 11*a*. Simultaneously with the serration teeth 22 reaching the predetermined position, there is generated on the axially central side a portion where no serration teeth 22 exist or the portion of the serration fit-in grooves which is located on the axially central side of the inserting portion 21 of the yoke and this portion constitutes the extending portions 11*b*.

The production method described above as the embodiment of the invention simply adds operations of extra further press fitting the yoke and then withdrawing the same yoke and therefore even if it is compared with the conventional joining method in which the yoke is joined to the shaft main body only through press fitting, the method makes in no way the production of the propeller shaft complicated. Consequently, the production method according to the embodiment is a method in which the propeller shaft of the invention can be produced extremely easily and which requires only the sinking force of a small magnitude while securing good rotating torque transmission properties. Note that conditions on the terminating positions of the yoke in the yoke press fitting and withdrawing steps, loads required when the yoke is press fitted and withdrawn, speeds at which the yoke is press fitted and withdrawn or the like may be suitably set depending upon types of propeller shafts to be produced. In addition, it is desirable that the distal and proximal ends of the serration teeth are made sharp in view of the fact that the inner circumferential surface of the shaft main body is cut out partially with the distal and proximal ends of the teeth of the serrations.

According to the production method of the invention, the yoke press fitting and yoke withdrawing steps of the production method according to the embodiment may be repeated a plurality of times. The serration fit-in grooves so formed become deeper by repeatedly performing the steps of press fitting and withdrawing the yoke. In that case, a range within which the yoke is repeatedly press fitted and withdrawn can be determined as extending from the position where the teeth of the serrations fit in at least the extending portions of the serration fit-in grooves to the position where the teeth of the serrations fit in the serration fit-in portions of the same grooves. In other words, between the state shown in FIG. 8 and the state shown in FIG. 11. The positions where the serration fit-in grooves actually function are the serration fit-in portions and the extending portions, and if the yoke is reciprocated at least within the aforesaid range, the performance of the propeller shaft according to the invention can be improved further in that the sinking force is reduced while good rotating torque transmission properties are secured.

Figure 12:
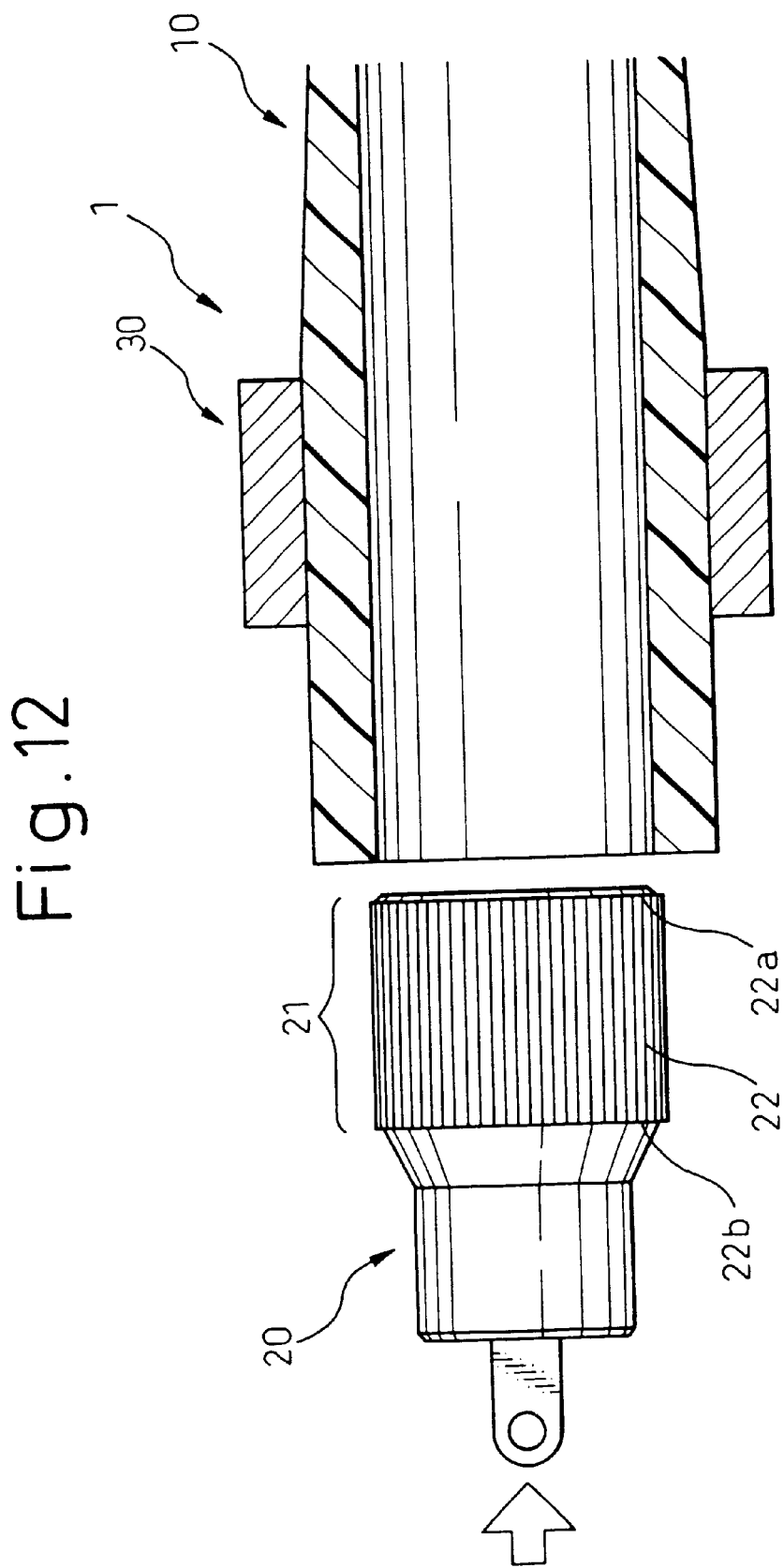
FIG. 12 is a diagram showing a state in which a pressing fixture for pressing an outer circumferential surface of a portion where extending portions are formed in an inner circumferential surface of the shaft main body in a production method according to the invention for forming the extending portions of the serration fit-in grooves more deeply.
Figure 13:
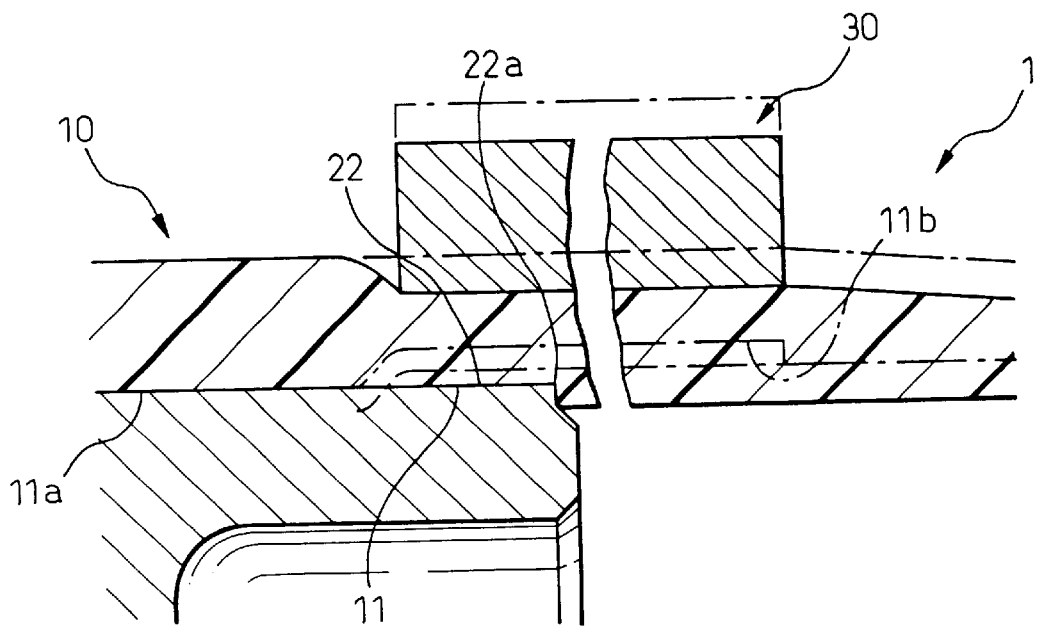
FIG. 13 is an enlarged view showing a state in which the extending portions are being formed in the inner circumferential surface of the shaft main body under being pressed by the pressing fixture in the production method according to the invention for forming the extending portions of the serration fit-in grooves more deeply.

Described next will be another embodiment of the propeller shaft production method according to the invention which is suitable for forming the extending portions of the serration fit-in grooves more deeply than the serration fit-in portions thereof. According to this embodiment, a means is added for contracting diametrically the portion where the extending portions of the serration fit-in grooves are formed on the inner circumferential surface of the shaft main body by applying a stress of certain magnitude to the outer circumferential surface of the shaft main body and expanding diametrically the portion of the inner circumferential portion of the shaft main body by removing the stress from the shaft main body after the extending portions have been formed. FIGS. 12 and 13 show states in which what is described above occurs. FIG. 12 shows the state in which a pressing fixture is disposed on the shaft main body so as to press the outer circumferential surface of the portion where the extending portions are expected to be formed on the inner circumferential surface of the shaft main body, and FIG. 13 shows the state in which the extending portions of the serration fit-in grooves are being formed on the inner circumferential surface of the shaft main body while being pressed by the pressing fixture. Note that as a matter of convenience in description, FIG. 13 shows typically, but in an exaggerated fashion, the state in which the shaft main body is diametrically contracted.

As shown in FIG. 12, for example, the outer circumferential surface of the portion where the extending portions are formed on the inner circumferential surface of the shaft main body 10 is pressed with the pressing fixture 30 before the extending portions are formed. Although not shown in detail, the pressing fixture 30 is an annular tool having the inside diameter which is almost identical to the outside diameter of the shaft main body 10 and is adapted to press the outer circumference of the shaft main body 10 by contracting diametrically.

In a case where the shaft main body 10 is pressed with the pressing fixture 30, as shown in FIG. 13, the inner and outer circumferential surfaces of the portion of the shaft main body 10 which is pressed contract diametrically. When the yoke is press fitted into the shaft main body 10 with the outer circumferential surface of the portion where the extending portions are to be formed, being pressed with the pressing fixture 30, the serration fit-in grooves formed by the teeth 22 of the serrations are formed such that the distance between the bottoms of the grooves and the axial center line of the shaft main body becomes constant at both the serration fit-in portions and the extending portions. In other words, the serration fit-in grooves look as if they were formed to the same groove depth at this point in time. After the serration fit-in grooves are formed or, for example, after the yoke press fitting and withdrawing steps are completed, if the pressing by the pressing fixture is released, the inner circumferential surface of the shaft main body 10 where the extending portions 11b are formed diametrically expands and is restored to the original diameter thereof. As a result, as shown by alternate long and short dash lines in FIG. 13, the extending portions 11b of the serration fit-in grooves 11 are formed, in realty, more deeply than the serration fit-in portions 11a.

The production method according to this embodiment only adds the means for pressing the outer circumferential surface of the shaft main body and causes no loss in efficiency with which the yoke press fitting and withdrawing steps are carried out. Forming the serration fit-in grooves more deeply at the deeper position along the length of the shaft main body or only the portion spaced away from the axial end of the shaft main body requires an operation involving difficulty, however, according to the production method of the embodiment, the propeller shaft constructed in accordance with the invention can be produced easily.

Note that there is no limitation to the pressing fixture used in this embodiment with respect to material, configuration, pressing mechanism and the like. In addition, either of the press fitting step and the withdrawing step may be carried out while being pressed, and similarly, in a case where press fitting and withdrawing are carried out a plurality of times, either of press fitting and withdrawing may be carried out more than once while being pressed. Furthermore, as described above, if the expanding phenomenon of the shaft main body occurring when the inserting portion of the yoke passes therethrough is applied, the pressing fixture may not have to be constructed so as to be displaced in association with the pressing by the passage of the inserting portion of the yoke but may be constructed so as to suppress the diametrical expansion of the shaft main body resulting from the passage of the inserting portion of the shaft main body as a result of the fixation thereof to the outer circumferential surface of the shaft main body. Even in this case, a stress of certain magnitude is applied to the outer circumferential surface of the shaft main body by virtue of a reaction force by the pressing fixture.

The propeller shaft production method according to the embodiment is characterized by the joining method of the shaft main body with the yoke, and therefore there is imposed no limitation to the other steps of the production method such as the steps of producing the shaft main body itself and the yoke itself. Although briefly, one example of a production method for each of the shaft main body and the yoke will be described below.

The shaft main body can be produced using the Filament Winding Method (hereinafter, referred to as "FW" method) which is widely used for producing FRP shaft main bodies. When the FW method is used, fibers impregnated with resin are supplied from a fiber supply unit, the fibers so supplied are then wound around a mandrel so as to form fiber layers, thereafter, the fiber layers so formed are set and removed from the mandrel, and finally the fiber layers are cut at ends thereof so as to be aligned with each other, whereby the production of a shaft main body is completed. In a case where the aforesaid reinforced portion is formed, the reinforced portion can be formed by using a means for extra laminating a separate reinforced fiber layer or winding the fibers more densely on a portion where the reinforced layer is to be provided to thereby increase the thickness of the shaft main body at the reinforced portion. Here, used as fibers for use for forming the shaft main body are carbon fiber, glass fiber, aramid fiber and the like, which can be used solely or in combination of two or more. In addition, used as resin for forming the shaft main body are epoxy resin, phenol resin, polyimide resin, vinyl ester resin and the like.

Next, in producing the yoke, for example, a yoke main body is made by casting a raw material in a molten state into a mold or forging and then machining the yoke main body so as to form serrations in an outer circumferential surface of a portion thereof which is to be fitted into the shaft main body. Here, used as materials for making the yoke are metallic materials such as various types of iron materials, aluminum and copper.

While the propeller shaft production method of the invention has been described heretofore, the embodiment described is only one example of the propeller shaft production method according to the invention, and therefore, the propeller shaft production method of the invention may be carried out in various modes including the embodiment described above which could be improved or modified by those skilled in the art.

Test Example

To simulate the production method according to the invention which has been described above, a press fitting and withdrawing test was carried out in which the yoke is repeatedly press fitted into and withdrawn from the shaft main body to measure press fitting force and withdrawing force resulting each time the yoke is press fitted into and withdrawn from the shaft main body. Additionally, the properties of the propeller shaft of the invention were evaluated from the results of the test. The results of the test and evaluation will be described item by item below.

Shaft Main Body and Yoke Used in the Test

The shaft main body used in the test was produced using the FW method. Carbon fibers and epoxy resin were used as fiber and resin for the shaft main body, respectively. Additionally, the mandrel used had an outside diameter (or the inside diameter of the shaft main body) of 75 mm and an overall length of 1400 mm. First of all, a roving (a bundle of a plurality of fibers arranged properly) impregnated with epoxy resin was helically wound around the mandrel on a portion corresponding to the overall length of the shaft main body at a predetermined angle so as to form an innermost layer having the inner circumferential surface of the shaft main body. Next, reinforced fiber layers were further helically wound to be formed over the innermost layer around portions of the mandrel corresponding to both end portions of the shaft main body, and furthermore, an outermost layer was helically wound to be formed over the reinforced layers and the innermost layer on the portion corresponding to the overall length of the shaft main body. Finally, polyester yawns were parallel wound on the outermost layer over the overall length of the shaft main body so as to form a protection layer. Following this, the setting of the epoxy resin was carried out in a heating oven heated to a temperature of 150 degrees C. Thereafter, the formed product was released from the mandrel, and the product so released was trimmed by cutting the ends thereof such that the shaft main body of 1100 mm results. The shaft main body for use for the test was thus produced.

In addition, the yoke of the propeller shaft used in the test was produced by forging steel to form a yoke main body, which was then machined in a predetermined fashion. The configuration and number of teeth of serrations formed in an outer circumferential surface of a inserting portion of the yoke were set so as to secure predetermined rotating torque properties.

Test Equipment and Testing Conditions

Test equipment comprised a fixing fixture for grip holding and fixing the shaft main body and a press fitting machine for press fitting and withdrawing the yoke into and from the shaft main body, respectively, with central axes of the yoke and the shaft main body being aligned with each other. The press fitting machine used was of a type that is hydraulically driven. In the test, the yoke was press fitted into the shaft main body from one end thereof and the yoke so press fitted was then withdrawn from the shaft main body, the cycle of press fitting and withdrawing being repeatedly performed, and forces required for press fitting and withdrawing the yoke were recorded.

Press Fitting the Yoke

Figure 14:
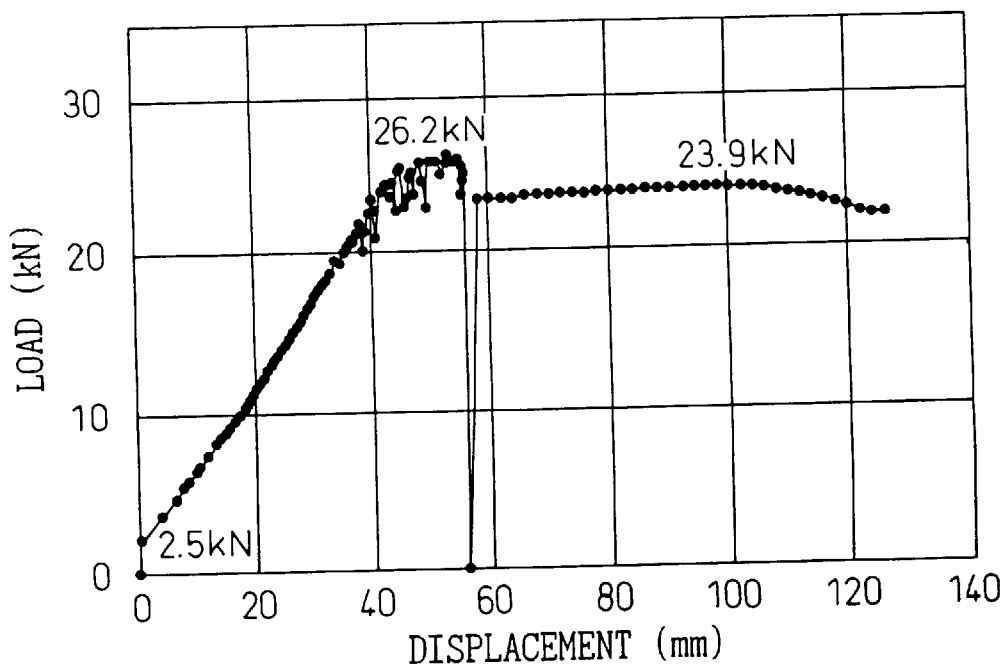
FIG. 14 is a graph showing a change in force required to press fit the yoke in a yoke press fitting and withdrawing test.

First, the yoke was press fitted into the one end of the shaft main body. This corresponds to the yoke press fitting step of the aforesaid production method. FIG. 14 shows the results of the measurement of a change in load (a force becoming a resistance when the yoke is press fitted) required for press fitting the yoke into the shaft main body. The axis of abscissae of a graph shown in FIG. 14 represents the axial displacement of the yoke into the shaft main body with the end where the yoke is press fitted being set as 0. In addition, the axis of ordinates represents a load required for press fitting the yoke, and a lower value means easier press fitting of the yoke into the shaft main body.

As has been described above, in press fitting the yoke into the shaft main body, the cutting force with which the distal ends of the teeth of the serrations cut out partially the inner circumferential surface and the friction force generated by the friction between the serration teeth and the inner circumferential surface of the shaft main body constitute resistance. Here, the cutting force is a force required by the serration teeth for the teeth to cut out the inner circumferential surface of the shaft main body, and the contact area between the serration teeth and the inner circumferential surface remains the same when serration fit-in grooves of the same groove depth are formed continuously. Thus, the value of the cutting force in the yoke press fitting step remains constant from a point in time where the serration teeth come into contact with the inner circumferential surface of the end portion of the shaft main body, and the value does not change thereafter. In contrast to this, the value of the friction force increases until the overall length of the serration teeth formed in the outer circumferential surface of the inserting portion of the yoke are completely press fitted into the shaft main body. This is because the contact area between the serration teeth and the inner circumferential surface of the shaft main body increases as the yoke is press fitted into the shaft main body. However, once the overall length of the serration teeth are completely press fitted into the shaft main body, the value of the friction force remains constant thereafter. This is because the contact area between the serration teeth and the inner circumferential surface becomes constant.

As shown in FIG. 14, the force applied at the same time as the yoke started to be press fitted into the shaft main body or the cutting force was 2.5 kN. The load started to increase gradually immediately after the yoke started to be press fitted and reached 26.2 kN. In this case, what changed was the friction force. After the whole of the inserting portion of the yoke was press fitted into the shaft main body, the serration fit-in portions of the serration fit-in grooves were formed in the inner circumferential surface of the shaft main body. Namely, the load required for forming the serration fit-in portions was 26.2 kN. A force of 23.9 was required to press fit the yoke further into the shaft main body. Namely, the force required for forming the extending portions of the serration fit-in grooves was 23.9 kN. This force is substantially equal to the force required by the conventional propeller shaft for the yoke thereof to sink into the shaft main body while cutting out partially the inner circumferential surface of the shaft main body. In other words, it was found that when an axial compression load of certain magnitude was applied to the conventional propeller shaft, the force required for the yoke to be allowed to sink into the shaft main body was 23.9 kN.

Withdrawing the Yoke

Figure 15:
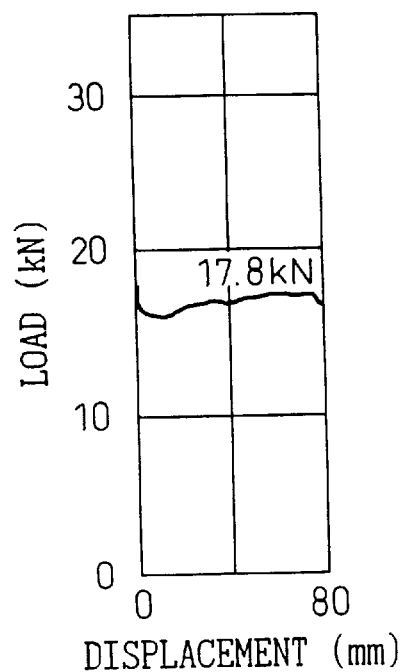
FIG. 15 is a graph showing a force required to withdraw the yoke in the yoke press fitting and withdrawing test.

Next, after the extending portions were formed, the yoke was withdrawn to a position where the serration teeth fit in the serration fit-in portions of the serration fit-in grooves with the teeth of the serrations being allowed to travel back along the serration fit-in grooves formed in the inner circumferential surface of the shaft main body when the yoke had been press fitted thereinto before. FIG. 15 shows a force required when the yoke was withdrawn. This corresponds to the yoke withdrawing step of the aforesaid production method. As shown in the figure, the force required for withdrawing the yoke was constant, and the value thereof was 17.8 kN. In view of the diametrical expansion and contraction phenomena of the shaft main body in association with the passage of the inserting portion of the yoke, even after the yoke had been once press fitted into the shaft main body, there still remained a margin of the serration fit-in grooves to be cut when the yoke was withdrawn. Consequently, even when the yoke was withdrawn, the cutting force was still additionally required on top of the friction force, and therefore, the value of 17.8 kN is considered to be the sum of the friction force and the cutting force.

Re-press Fitting the Yoke

Figure 16:
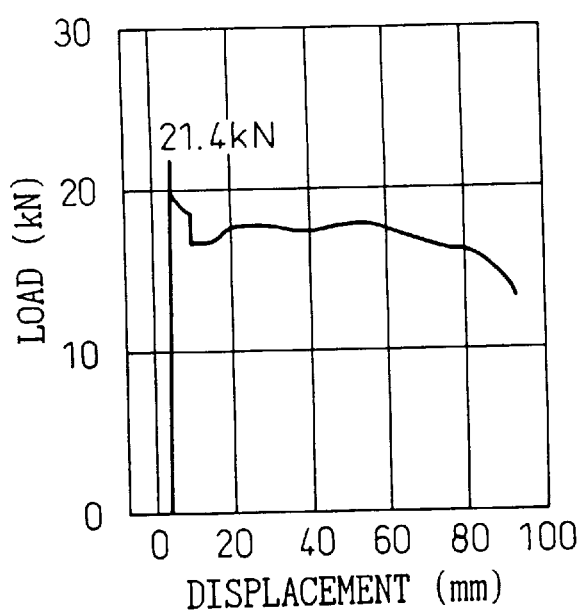
FIG. 16 is a graph showing a force required to re-press fit the yoke in the yoke press fitting and withdrawing test.

The yoke was re-press fitted along the serration fit-in grooves in the inner circumferential surface of the shaft main body to the position where the extending portions of the serration fit-in grooves were formed or the position where the serration teeth fit in the extending portions (hereinafter, referred to as "re-press fitting"). FIG. 16 shows a force required for re-press fitting the yoke. As shown in the figure, the force required for re-press fitting the yoke was substantially constant, and the value was 21.4 kN. As described previously, even in this step, since the cutting force as well as the friction force was added, this value of 21.4 kN is considered to be the sum of the friction force and the cutting force. In addition, this value corresponds to the sinking force for the yoke to be allowed to sink into the shaft main body when an axial compression load of certain magnitude is applied to the propeller shaft of the invention in which the extending portions of the serration fit-in grooves are formed in advance. As has been described before, when an axial compression load of certain magnitude was applied to the conventional propeller shaft, the extending portions of the serration fit-in grooves had to be carved in order to allow the yoke to sink into the shaft main body, and therefore, the force required then was 23.9 kN. Consequently, it was found from this that when compared with the conventional propeller shaft, the propeller shaft of the invention helped reduce the sinking force by an amount equal to 2.5 kN. Note that this value of 2.5 kN is substantially equal to the cutting force required when the yoke was initially press fitted into the shaft main body, and it is considered that the press fitting force of the re-press fitting step can be reduced by an amount by which the force required for cutting is reduced when compared with the initial press fitting step.

Re-withdrawing the Yoke

Figure 17:
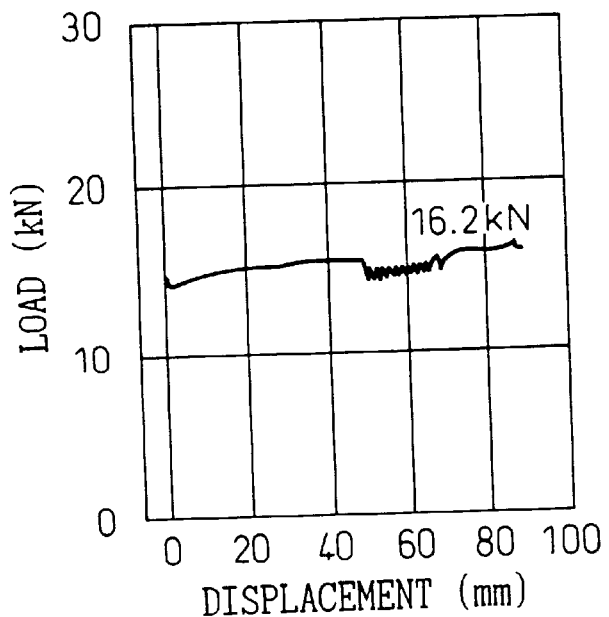
FIG. 17 is a graph showing a force required to re-withdraw the yoke in the yoke press fitting and withdrawing test.

The yoke was withdrawn again to the position where the serration teeth fit in the serration fit-in portions of the serration fit-in grooves with the serration teeth in the inserting portion thereof being allowed to travel back along in the serration fit-in grooves formed on the inner circumferential surface of the shaft main body. FIG. 17 shows a force required for withdrawing (hereinafter, referred to as "re-withdrawing") the yoke then. As shown in the figure, the force required for re-withdrawing the yoke was substantially constant, and the value was 16.2 kN. As has been described previously, it is considered that a cutting force of a certain magnitude is still required in re-withdrawing the yoke even after the press fitting and withdrawing had been carried out twice and once, respectively. Therefore, since it is considered that since the cutting force as well as the friction force is added, this value of 16.2 kN is the sum of the friction force and the cutting force. However, the value became lower than the force (17.8 kN) required when the aforesaid yoke withdrawing step was carried out. This is because the remaining margin to be cut during the re-withdrawing step was reduced when compared with the initial withdrawing step, whereby the force required for cutting in the re-withdrawing step is considered to be lower than in the initial withdrawing step.

Further Re-press Fitting the Yoke

Figure 18:
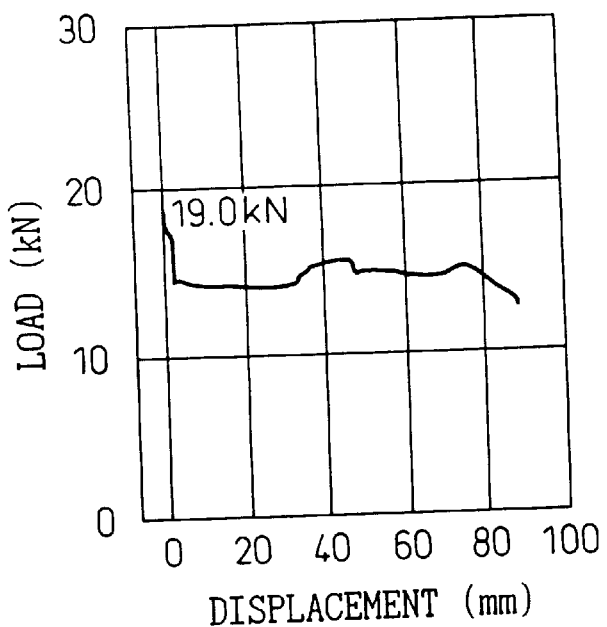
FIG. 18 is a graph showing a force required to further re-press fit the yoke in the yoke press fitting and withdrawing test.

The yoke was press fitted for the third time (hereinafter, referred to as "further re-press fitting") into the shaft main body along the serration fit-in grooves formed on the inner circumferential surface thereof as far as the position where the serration teeth fit in the extending portions of the serration fit-in grooves. FIG. 18 shows a force required for further re-press fitting the yoke then. As shown in the figure, the force required for further re-press fitting the yoke was substantially constant, and the value was 19.0 kN. As has been described previously, even in this step, it is expected that a cutting force is added to a friction force, and therefore, this value of 19.0 kN is considered to be the sum of the friction force and the cutting force. Additionally, this value indicates the sinking force required to allow the yoke to sink into the shaft main body when an axial compression load of certain magnitude is applied to the propeller shaft of the invention in which the yoke press fitting step and the yoke withdrawing step have repeatedly been carried out twice, respectively. As is described above, the force of 23.9 kN was needed for allowing the yoke to sink into the shaft main body when an axial compression force of certain magnitude was applied to the conventional propeller shaft having no extending portions. Consequently, it was found that when compared with the conventional propeller shaft, this particular propeller shaft of the invention could reduce the sinking force by an amount equal to 4.9 kN. In addition, it was also found that when compared with the propeller shaft of the invention wherein the yoke was press fitted and withdrawn once, respectively, (the sinking force=21.4 kN) the particular propeller shaft of the invention which was subjected to further re-press fitting could reduce the sinking force by an amount equal to 2.4 kN. Thus, since the required cutting force becomes smaller every time press fitting or withdrawing the yoke is carried out, the sinking force in turn becomes smaller, and ultimately, if press fitting and withdrawing continue to be carried out until the outside diameter of the inserting portion of the yoke becomes equal to the diameter of a circle imaginarily formed by connecting the bottoms of the grooves formed in the shaft main body, the value of the cutting force becomes zero, and only the friction force is left as the resistance generated at the time of the yoke sinking into the shaft main body, whereby the sinking force becomes minimum.

SUMMARY

As a result of the aforesaid test, press fitting force and drawing force in the respective steps ranging from the initial press fitting step to the further re-press fitting step are shown in Table 1 below.

TABLE 1

| Step | press fitting | withdrawing | re-press fitting |
|---|---|---|---|
| Force kN | 23.9 | 17.8 | 21.4 |
| Step | re-withdrawing | further re-press fitting | |
| Force kN | 16.2 | 19.0 | |

When comparing the press fitting force in the press fitting step with the press fitting force in the re-press fitting step, it is found that the press fitting force in the re-press fitting step becomes smaller than the press fitting force of the press fitting step and therefore it could be confirmed that the propeller shaft of the invention requires a sinking force smaller than that of the conventional propeller shaft having no extending portions of the serration fit-in grooves. It could also be confirmed from the fact that the press fitting force became smaller in the order of the press fitting step, the re-press fitting step and further re-press fitting step that the propeller shaft of the invention having the extending portions of the serration fit-in grooves which are deeper requires a sinking force of smaller magnitude.

In addition, since the press fitting and withdrawing test was carried out to simulate the production method of the invention, it could be confirmed that the propeller shaft of the invention could be produced easily using the production method of the invention. Furthermore, it could also be confirmed that the propeller shaft of the invention requiring a sinking force of smaller magnitude could be produced easily by repeating the press fitting and withdrawing of the yoke a plurality of times according the production method of the invention.

The invention is intended to construct a propeller shaft comprising the shaft main body and the yoke which is mounted to the shaft main body with the serrated inserting portion thereof being press fitted into the inner circumferential surface of the shaft main body in such a manner that the serration fit-in grooves having the extending portions into which the serration teeth travel when the yoke is allowed to sink into the shaft main body are formed on advance on the inner circumferential surface of the shaft main body. With the construction, the invention can provide the propeller shaft which requires only the sinking force of small magnitude while managing to secure the good rotating torque transmission properties.

In addition, the invention provides the method for producing the propeller shaft constructed as described above which comprises the yoke press fitting step and the yoke withdrawing step that is to be performed after the former step. With the production method so configured, the propeller shaft according to the invention can be produced through an extremely easy and simple operation.

What is claimed is:

1. A propeller shaft comprising a tubular shaft main body made of FRP and a metallic yoke having an inserting portion which has serrations having axially extending teeth formed on an outer circumferential surface thereof and mounted on at least one end portion of said shaft main body with said inserting portion being slide fitted into an inner circumferential surface of said one end portion of said shaft main body, wherein said shaft main body comprises serration fit-in grooves formed on the inner circumferential surface thereof and having serration fit-in portions into which the teeth of said serrations are allowed to fit and extending portions formed continuously with said serration fit-in portions so as to extend more inwardly from axially central side ends of the teeth of said serrations toward an axial center of said shaft main body, wherein the metallic yoke is capable of entering further into the shaft main body when an axial compression load is applied to the metallic yoke while engaging the serration fit-in grooves of the extending portions; and the metallic yoke insertion portion has an outer diameter that is greater than the inner diameter of the tubular shaft main body prior to insertion, wherein said extending portions of said serration fit-in grooves are formed deeper than said serration fit-in portions.

2. A propeller shaft according to claim 1, wherein the thickness of said shaft main body is made thicker over a predetermined portion ranging from said one end of said shaft main body where said yoke is mounted toward the axial center thereof, and wherein axially central side ends of said extending portions of said serration fit-in grooves are located at positions coinciding with an axially central side end of said predetermined portion or closer to the axial center of said shaft main body than said axially central side end of said predetermined portion.

* * * * *